(12) United States Patent
Allen

(10) Patent No.: US 11,699,044 B1
(45) Date of Patent: Jul. 11, 2023

(54) APPARATUS AND METHODS FOR GENERATING AND TRANSMITTING SIMULATED COMMUNICATION

(71) Applicant: Todd Allen, Bluffton, SC (US)

(72) Inventor: Todd Allen, Bluffton, SC (US)

(73) Assignee: Todd Allen, Bluffton, SC (US)

( * ) Notice: Subject to any disclaimer, the term of this patent is extended or adjusted under 35 U.S.C. 154(b) by 0 days.

(21) Appl. No.: 17/977,107

(22) Filed: Oct. 31, 2022

(51) Int. Cl.
*G06F 40/30* (2020.01)
*G06V 10/82* (2022.01)
*G06V 30/19* (2022.01)

(52) U.S. Cl.
CPC .............. *G06F 40/30* (2020.01); *G06V 10/82* (2022.01); *G06V 30/19147* (2022.01)

(58) Field of Classification Search
CPC ... G06F 40/30; G06V 30/19147; G06V 10/82
See application file for complete search history.

(56) References Cited

U.S. PATENT DOCUMENTS

| | | | | |
|---|---|---|---|---|
| 11,531,805 B1* | 12/2022 | Marzorati | ............. | G06F 40/109 |
| 2016/0004672 A1* | 1/2016 | Sakunkoo | ............... | H04L 51/08 |
| | | | | 715/269 |
| 2018/0297392 A1* | 10/2018 | Caberwal | ............. | B43L 13/026 |
| 2018/0349021 A1* | 12/2018 | Rubalcava | .......... | G06F 3/04883 |
| 2020/0403957 A1* | 12/2020 | Holwill Rauch | ..... | H04L 51/212 |
| 2021/0150789 A1* | 5/2021 | Szarzynski | ........... | G06T 11/203 |
| 2021/0166013 A1* | 6/2021 | Tensmeyer | ............. | G06N 3/045 |
| 2022/0335209 A1* | 10/2022 | Kuo | ....................... | G06V 10/82 |
| 2022/0406081 A1* | 12/2022 | Seto | ................. | G06V 30/19147 |

\* cited by examiner

*Primary Examiner* — Kevin Ky
(74) *Attorney, Agent, or Firm* — Caldwell Intellectual Property Law

(57) ABSTRACT

An apparatus and methods for generating automated communication simulation using artificial intelligence is disclosed. The apparatus comprises at least a processor, a memory communicatively connected to the processor, wherein the memory includes instructions configuring the at least a processor to receive a prior communication datum from a first user, parse the prior communication datum to extract at least a contextual datum relating to a second user, generate a correspondence simulation from the first user to the second suer as a function of the at least a contextual datum, receive a prior handwriting image datum from the first user, classify at least a portion of the prior handwriting image datum to at least a glyph, identify at least a semantic match to the at least a glyph in the correspondence simulation, generate and transmit an automated communication simulation using the at least a semantic match and the correspondence simulation.

20 Claims, 8 Drawing Sheets

APPARATUS AND METHODS FOR GENERATING AND TRANSMITTING SIMULATED COMMUNICATION

FIELD OF THE INVENTION

The present invention generally relates to the field of simulated communication. In particular, the present invention is directed to learning-based methods and Artificial Intelligence (AI) powered system for simulating and transmitting communication contents.

BACKGROUND

Enhanced automated communication simulation is a complex process which requires collecting and training a variety of information relating to the parties involved. Existing computer systems provide little support to a user's communication capability when the user is absent, incapacitated, or deceased, not to mention the inability to generate contextual correspondence based on the user's prior communication and/or handwriting. As a result, the communications generated are generally ineffective at anticipating the contextual information associated with the user.

SUMMARY OF THE DISCLOSURE

In one aspect, an apparatus for generating automated communication simulation using artificial intelligence is disclosed. The apparatus comprises at least a processor, a memory communicatively connected to the processor, wherein the memory includes instructions configuring the at least a processor to receive a prior communication datum from a first user, parse the prior communication datum to extract at least a contextual datum relating to a second user, generate a correspondence simulation from the first user to the second user as a function of the at least a contextual datum, receive a prior handwriting image datum from the first user, classify at least a portion of the prior handwriting image datum to at least a glyph, identify at least a semantic match to the at least a glyph in the correspondence simulation, generate and transmit an automated communication simulation using the at least a semantic match and the correspondence simulation.

In another aspect, a method for generating automated communication simulation using artificial intelligence is disclosed. The method comprises receiving, by at least a processor, a prior communication datum from a first user; parsing, by the at least a processor the prior communication datum to extract at least a contextual datum relating to a second user; generating, by the at least a processor, a correspondence simulation from the first user to the second suer as a function of the at least a contextual datum; receiving, by the at least a processor, a prior handwriting image datum from the first user; classifying, by the at least a processor, at least a portion of the prior handwriting image datum to at least a glyph; identifying, by the at least a processor, at least a semantic match to the at least a glyph in the correspondence simulation; generating, by the at least a processor, an automated communication simulation using the at least a semantic match and the correspondence simulation; and transmitting, by the at least a processor, the automated communication simulation to the second user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
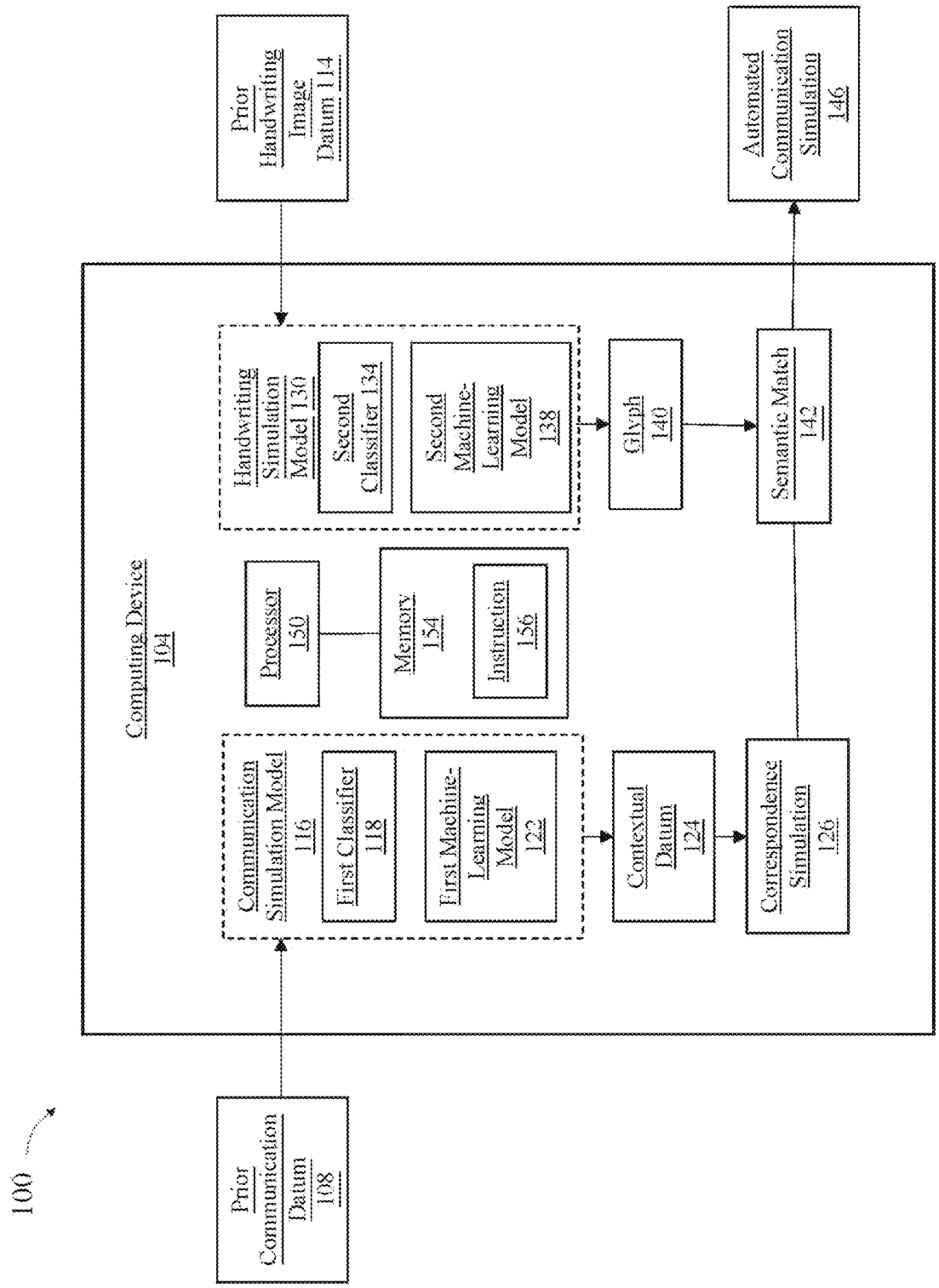
FIG. 1 is a block diagram illustrating an exemplary embodiment of a system for generating automated communication simulation using artificial intelligence.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an apparatus for generating automated communication simulation using training samples and machine-learning process based on prior communication between a first user and a second user.

At a high level, other aspects of the present disclosure are directed to an apparatus for generating handwriting simulations using training samples and machine-learning process based on prior handwriting data associated with the first user.

Exemplary embodiments illustrating aspects of the present disclosure are described below in the context of several specific examples.

As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Now referring to FIG. 1, an exemplary embodiment of an apparatus 100 for generating automated communication simulation using AI is illustrated. Computing device 104 includes at least a processor 150 configured to generate a communication simulation model 116 and a handwriting simulation model 130. In one embodiment, computing device 104 may include and/or communicate with any other computing device as described in this disclosure, including without limitation a microcontroller, microprocessor, digital signal processor (DSP) and/or system on a chip (SoC) as described in this disclosure. Further, computing device may include a single computing device operating independently, or may include two or more computing device operating in concert, in parallel, sequentially or the like; two or more computing devices may be included together in a single computing device or in two or more computing devices. In one embodiment, processor 150 may include any suitable processor, such as without limitation a processor incorporating logical circuitry for performing arithmetic and logical operations, such as an arithmetic and logic unit (ALU). Processor 105 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Still referring to FIG. 1, apparatus 100 also includes memory 154 communicatively connected to processor 150, wherein memory 154 is configured to store computer-executable instructions 156 (e.g., software) on one or more machine-readable media to implement any one or more of the aspects of apparatus 100 and/or methodologies of the present disclosure. In one embodiment, memory 154 may include various components (e.g., machine-readable media) including, but not limited to, a random-access memory component, a read only component, and any combinations thereof. In another example, memory 154 may further include any number of program modules including, but not limited to, an operating system, one or more application programs, other program modules, program data, and any combinations thereof.

Still referring to FIG. 1, in one embodiment, communication simulation model 116 and handwriting simulation model 130 are communicatively connected to each other. The communication simulation model 116 is configured to receive prior communication datum 108 from a first user. As used in this disclosure, a "first user" is a person who may be a currently absent and/or deceased, or a person who is not yet absent or deceased. "Prior communication datum," as used in this disclosure, is any communication records associated with the first user and a second user whom can be associated with the first user. In one embodiment, prior communication datum 108 may include textual communication, including handwritten, typed, and/or electronic communication correspondence between the first user and the second user, recorded audio of the first user, recorded video of the first user, and/or pictures of the first user. In one embodiment, prior communication datum 108 may include one or more handwriting samples, voice samples, drawing samples, or other samples of the first user's communication form. In some embodiments, prior communication datum 108 may include content describing activities, personality, biographical facts, and/or other information associated with the first user. In other embodiments, prior communication datum 108 may optionally include collecting communications sent to the first user by the second user and/or communications describing the first user, activities of the first user, shared activities with a second user, social media posts of the first user, pictures, biographical and/or autobiographical material, or the like. In some embodiments, prior communication datum 108 may include handwritten correspondence between the first user and the second user, typed correspondence between the first user and the second user, electronic correspondence between the first user and the second user, recorded audio between the first user and the second user, recorded video between the first user and the second user, pictures between the first user and the second user, drawings between the first user and the second user, social media posts between the first user and the second user, and content describing activities, personality, and biographical facts of the first user and the second user.

Still referring to FIG. 1, prior communication datum 108 may be sorted into a plurality of categories using a first classifier 118 automatedly trained by a plurality of training data associated with prior communication datum 108. In one embodiment, training data may include samples associated with handwritten correspondence between the first user and the second user, typed correspondence between the first user and the second user, electronic correspondence between the first user and the second user, recorded audio between the first user and the second user, recorded video between the first user and the second user, pictures between the first user and the second user, drawings between the first user and the second user, social media posts between the first user and the second user, and content describing activities, personality, and biographical facts of the first user and the second user. In some embodiments, training data may be manually selected and provided by the first user. In some embodiments, training data may be automatically collected by the processor via a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to scrape data associated with the first user and the second user from user related social media and networking platforms. The web crawler may be seeded and/or trained with a user's social media handles, name, and common platforms a user is active on. The web crawler may be trained with information received from a user through a user interface. A "user interface," as used in this disclosure, is a means by which the user and a computer system interact, including the use of input devices and software. For example, a user may input into a user interface, social media platforms they have accounts on and would like to retrieve user data from. A user interface may include a graphical user interface (GUI), command line interface (CLI), menu-driven user interface, touch user interface, voice user interface (VUI), form-based user interface, and the like. Computing device 104 may receive information such as a user's name, platform handles, platforms associated with the user and the like, from the user interface. In some embodiments, user database may be populated with data associated with the first user and the second user received from the user interface. A web crawler may be generated by a computing device 104. In some embodiments, a web crawler may be configured to generate a web query. A web query may include search criteria. Search criteria may include photos, videos, audio, user account handles, web page addresses and the like received from the user. A web crawler function may be configured to search for and/or detect one or more data patterns. A "data pattern" as used in this disclosure is any repeating forms of information. A data pattern may include, but is not limited to, features, phrases, and the like as described further below in this disclosure. The web crawler may work in tandem with any machine-learning model, digital processing technique utilized by computing device 104, and the like as described in this disclosure. In some embodiments, a web crawler may be configured to determine the relevancy of a data pattern. Relevancy may be determined by a relevancy score. A relevancy score may be automatically generated by a computing device 104, received from a machine learning model, and/or received from the user. In some embodiments, a relevancy score may include a range of numerical values that may correspond to a relevancy strength of data received from a web crawler function. As a non-limiting example, a web crawler function may search the Internet for photographs of the first and/or the second user based on photographs received from the first and/or the second user. The web crawler may return data results of photos of the first and/or the second user and the like. In some embodiments, the computing device may determine a relevancy score of each photograph retrieved by the web crawler. In one embodiment, at least one contextual datum 124 is extracted after prior communication datum 108 is categorized. A "contextual datum" as disclosed herein, is information such as communications, descriptions, text messages, pictures, videos, and the like associated with the first user and/or the second user. The communication simulation model then generates a correspondence simulation 126 as a function of the at least one contextual datum 124 using a first machine-learning model 122.

Still referring to FIG. 1, in one embodiment, handwriting simulation model 130 is configured to receive prior handwriting image datum 114 from the first user. A "prior handwriting image datum," as disclosed herein, is any handwriting records such as physical and digital samples of handwriting images. Prior handwriting image datum 114, in one embodiment, may include a handwriting sample on a paper or an image of a handwriting sample. Handwriting simulation model 130 then classifies the prior handwriting image datum 114 into categories using a second classifier 134 in order to classify at least a portion of the prior handwriting image datum 114 to at least a glyph 140. As used in this disclosure, a "glyph" is a specific shape, design, or representation of a character made by a user. Glyph 140 may include information associated with an individual character based on the first user's unique handwriting, such as strokes, curves, thickness, loops, inflection points, positioning, aspect ratio, and the like. A second machine-learning model 138 is trained using at least a training sample, wherein the training sample correlates an image of the at least glyph 140 to a semantic meaning of the at least a glyph 140. In one embodiment, a handwriting style datum is generated as a function of the at least a glyph 140 in accordance with the prior handwriting image datum 114 before an automated communication simulation 146 is generated as a function of the correspondence simulation 126 and at least a semantic match 142. A "semantic match," as disclosed herein, is a match of characters based on a specific shape, design, or representation of a character and the logical correspondence of the character. In one embodiment, and without limitation, the automated communication simulation 146 is transmitted to the second user. In one embodiment, a transmission module communicatively connected to processor 150 is configured to automatically transmit the automated communication simulation 146 in a pre-selected format and at a pre-determined time interval. For instance, in a non-limiting example, the first user may preselect a delivery format such as a physical and/or digital birthday card auto-generated with the first user's handwriting communication and/or images and/or images with the second user and the preselected card may be delivered annually on the second user's birthday.

Continuing to refer to FIG. 1, in one embodiment, the communication simulation model 116 includes training a machine-learning process to generate a first machine-learning model 122 and the handwriting simulation model 130 includes training a machine learning process to generate a second machine-learning model 138 in order to generate correspondence simulation 126 and a handwriting style datum respectively from the first user. In one embodiment, first machine-learning model 122 is trained using at least a training sample, wherein the training sample correlates a prior communication between the first user and the second user to a contextual datum in similar context. For instance, in a non-limiting example, the training sample may correlate a prior communication containing a birthday wish sent from the first user to the second user with a specific timestamp to a contextual datum associated with significant life events of the second user. In one embodiment, second machine-learning model 138 is trained using at least a training sample, wherein the at least a training sample correlates an image of the at least a glyph 140 to a semantic meaning of the at least a glyph 140. For instance, in a non-limiting example, the training sample may pair a handwriting sample of individual characters made by the first user to a set of manually labeled characters based on the semantic meaning. A machine learning process, as used in this disclosure, is a process that automatedly uses training data to generate an algorithm and/or model, defined as a "machine-learning model" that will be performed by the processor 150 to produce outputs given data provided as inputs, for instance and without limitation as described in further detail below. This is in contrast to a non-machine learning software program where the commands to be executed are determined in advance by a user and written in a programming language. Training data, which may include any training data as described in further detail below, is data including correlations and/or examples usable by a machine learning algorithm to generate machine-learning process and/or to be operated on by a lazy learning algorithm as described below. Training data may be obtained by processor 150 in any manner and/or form as described anywhere in this disclosure, including and without limitation retrieving from prior communication datum 108 and prior handwriting image datum 114. In a non-limiting example, processor 150 may train machine-learning process using decision tree training data, wherein the decision tree training data include a plurality of data collections as input correlated to a plurality of decision trees as output.

Continuing to refer to FIG. 1, each machine-learning process includes a first classifier 118 and a second classifier 134 respectively, which may classify inputs such as prior communication datum 108 and prior handwriting image datum 114 to decision metric and the like thereof. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 150 and/or another device may generate a classifier using a classification algorithm, defined as a process whereby processor 150 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, boosted trees, random forest classifiers, learning vector quantization, and/or neural network-based classifiers. As a further non-limiting example, classification may be performed using a neural network classifier such as without limitation a convolutional neural network-based classifier. A convolutional neural network is a neural network in which at least one hidden layer is a convolutional layer that convolves inputs to that layer with a subset of inputs known as a "kernel," along with one or more additional layers such as pooling layers, fully connected layers, and the like.

Still referring to FIG. 1, processor 150 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 150 may then calculate a likelihood table by calculating probabilities of different data entries and classification labels. Processor 150 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 150 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in one embodiment, handwriting simulation model 130 may involve machine learning methods like Hidden Markov Models (HHM), Support-Vector Machine SVM etc. HMMs as used herein are statistical models with inference algorithms that that may be applied to the models. In such models, a hidden state to be estimated may include an association between an extracted word, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations. Once the prior prior handwriting image datum 114 is pre-processed, feature extraction is performed to identify key information such as strokes, curves, thickness, loops, inflection points, aspect ratio etc. of an individual character. The key information is then fed to the second classifier 134 for the training of the second machine-learning model 138.

Still referring to FIG. 1, in one embodiment, apparatus 100 for generating communication simulation using AI includes a computing device 104 configured to employ handwriting recognition techniques. In some embodiments, handwriting simulation model 130 includes a handwriting text recognition module which may include Optical Character Recognition or Optical Character Reader (OCR), Optical Word Recognition (OWR), Handwritten Text Recognition (HTR), Intelligent Character Recognition (ICR), or Intelligent Word Recognition (IWR) configured to automatically convert images of written (e.g., typed, handwritten or printed text) into machine-encoded text. In some cases, OCR may recognize written text, one glyph or character at a time. In some cases, OWR may recognize written text, one word at a time, for example, for languages that use a space as a word divider. In some cases, ICR may recognize written text one glyph or character at a time, for instance by employing machine learning processes. In some cases, IWR may recognize written text, one word at a time, for instance by employing machine learning processes.

Still referring to FIG. 1, handwriting recognition techniques can be broadly classified into two types: online methods and offline methods. Online methods involve the utilization of digital stylus and have access to stroke information and pen location while text is being written by the first user. Online methods provide real-time information with regards to the flow of text being written by the first user which can be classified at a high accuracy rate and the demarcation between different characters in the text becomes much clearer. In many cases, handwriting movement can be used as input to various handwriting recognitions. As such, instead of merely using shapes of glyphs and words, motions, such as the order in which segments are drawn, the direction, and the pattern of putting the pen down and lifting it are captured. Online methods are also referred to as online character recognition, dynamic character recognition, and real-time character recognition. However, not all users are available to accommodate the online methods. In contrast, offline methods are more common as they involve recognizing text once it is written down. In one embodiment, the handwriting recognition techniques may be "offline" processes, which analyze a static document or image frame.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 2-5. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 3-4.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Continuing referring to FIG. 1, in some embodiments, the communication simulation model 116 is configured to recognize and process prior communication datum 108 which includes a voice datum. The communication simulation model 116 may require training (i.e., enrollment). In some cases, training the communication simulation model 116 may require the first user to read text or isolated vocabulary. In some cases, a solicitation video may include an audio component having an audible verbal content, the contents of which are known a priori by computing device 104. Computing device 104 may then train an automatic speech recognition model according to training data which includes audible verbal content correlated to known content. In this way, computing device 104 may analyze the first user's specific voice and train the automatic speech recognition model to the first user's speech, resulting in increased accuracy. Alternatively or additionally, in some cases, computing device 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMIs) may include statistical models that output a sequence of symbols or quantities. HMIs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments, HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of several techniques in order to improve the simulation results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and an linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks(TDNN's) may be used for automatic speech recognition, for example over longer time intervals for continuous speech recognition.

Figure 2:
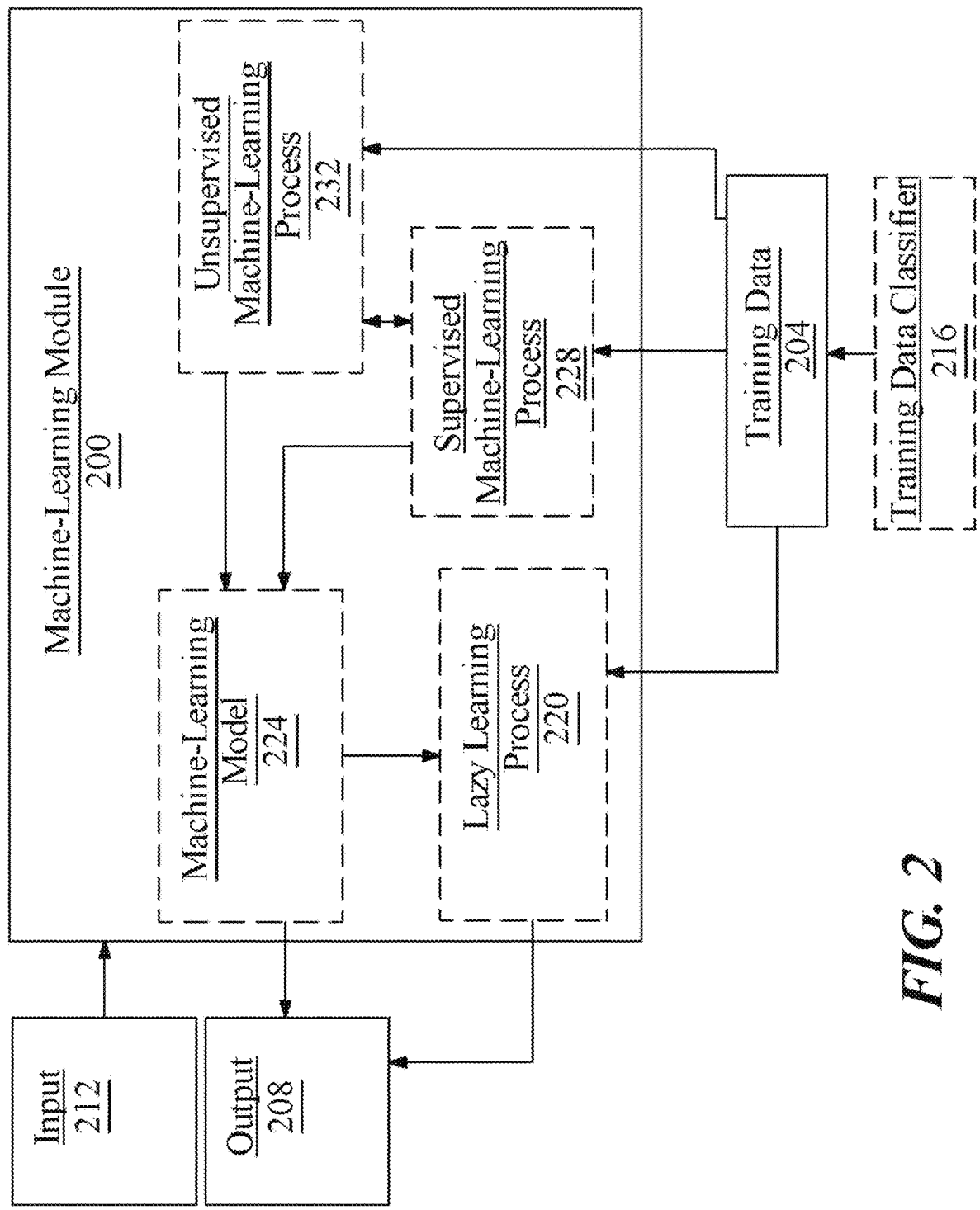
FIG. 2 is a block diagram illustrating an exemplary embodiment of a machine-learning model.

Referring now to FIG. 2, an exemplary embodiment of a machine-learning model 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. In one embodiment, training data 204 may include handwritten correspondence from and to the first user, typed correspondence from and to the first user, electronic correspondence from and to the first user, recorded audio from and to the first user, recorded video from and to the first user, pictures of the first user, drawings from the first user, social media posts of the first user, content describing activities, personality, and biographical facts of the first user, and communication and activity contents shared between the first user and the second user. In another embodiment, training data 204 may also include handwriting samples from the first user concerning an individual character's strokes, curves, loops, inflection points, aspect ratios, edges, thickness, and depths. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning model 200 may correlate any input data as described in this disclosure to any output data as described in this disclosure. As a non-limiting illustrative example, segments/images of handwriting samples and video and/or voice recordings may be inputs, wherein an output may be a simulation function.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning model 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to sub-categories of the morphology of characters.

Still referring to FIG. 2, machine-learning model 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the morphology of individual characters in a handwriting sample as described above as inputs, simulation functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning model 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
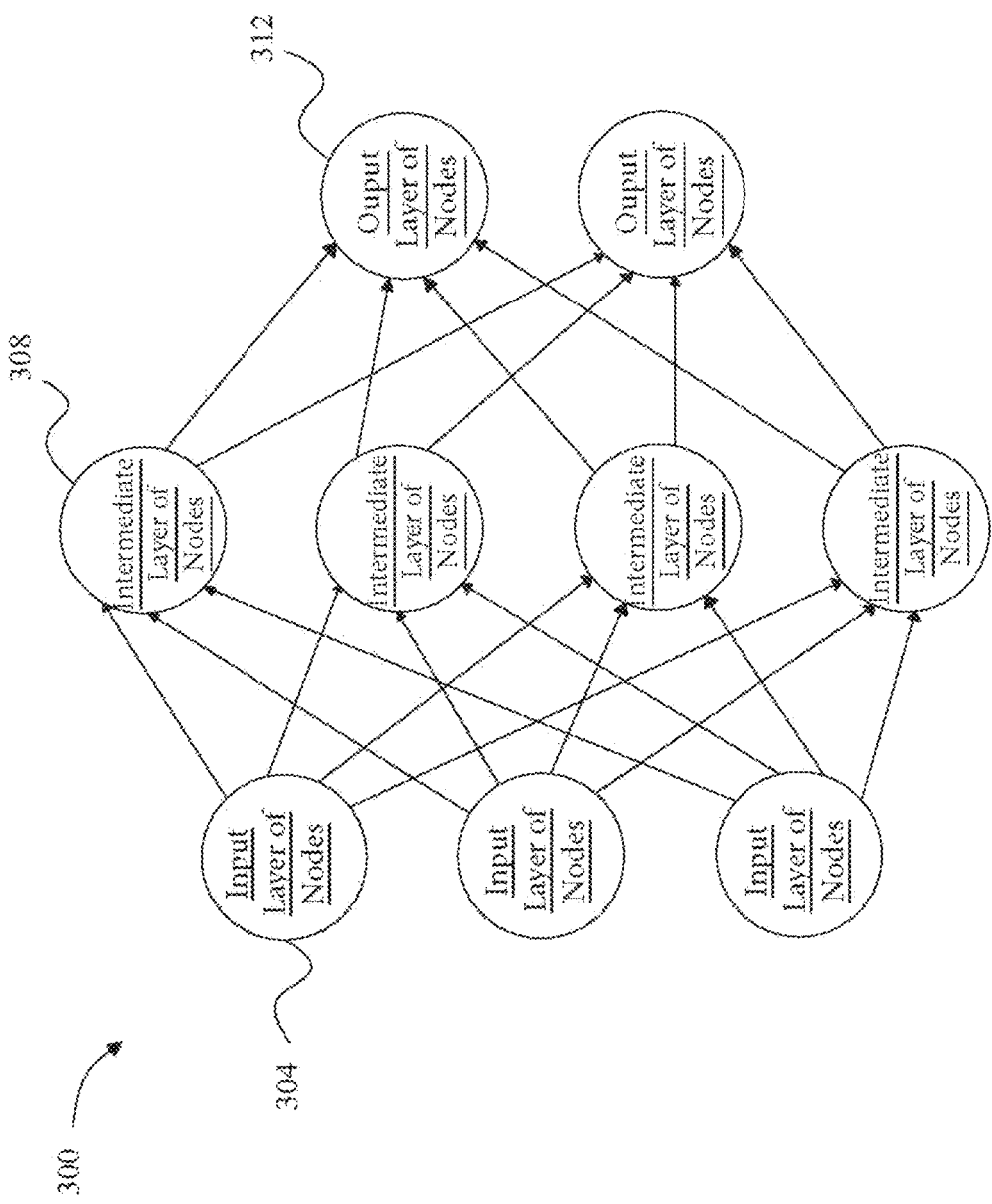
FIG. 3 is a block diagram illustrating an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Still referring to FIG. 3, in one embodiment, neural network 300 is a multi-dimensional recurrent neural network (MDRNN) applied to a convolutional neural network to provide effective dimensional sequence learning tasks with respect to offline and online handwriting and voice recognition. In some instances, convolutional neural networks must rely on specified kernel sizes to introduce context in a one-dimensional domain as they are non-recurrent. As a result, sequences of image and video samples must be pre-segmented into individual characters before they can be recognized by convolution networks. MDRNNs provide the ability to access contextual information and robust input warping along the time-axis than non-recursive models in multi-dimensional domains. It also provides the flexibility to make use of prior context in both temporal and spatial dimensions. In a forward pass, at each point in the data sequence of a two-dimensional handwriting datum, the hidden layer of the network receives both an external input and its own activations from one step back along all dimensions. In one embodiment, the data is processed in such a way that when the network reaches a point in an n-dimensional sequence, it has already passed through all the points from which it will receive its previous activations. This can be ensured by following a suitable ordering on the set of points $\{(x_1, x_2, \ldots, x_n)\}$. In one embodiment, and without limitation, a suitable ordering is $(x_1, \ldots, x_n) < (x_1, \ldots, x_n)$ if $\forall m \in (1, \ldots, n)$ such that $x_m < x_m$ and $x_i = x_i$ $\forall_i \in (1, \ldots, m-1)$. The forward pass of an MDRNN can be carried out by feeding forward the input and the n previous hidden layer activations at each point in the ordered input sequence, and sorting the resulting hidden layer activations. In a two-dimensional handwriting sample image, the inputs can be single pixels represented by RGB triples if the sample is a color image, or blocks of pixels, or the outputs of a preprocessing method such as a discrete cosine transform. The error gradient of an MDRNN (i.e., the derivative of some objective function with respect to the network weights) can be calculated with an n-dimensional extension of backpropagation through time (BPTT). In a one-dimensional BPTT, the sequence is processed in the reverse order of the forward pass. At each timestep, the hidden layer receives both the output error derivatives and its own n 'future' derivatives. The overall complexity of MDRNN training is linear in the number of data points and the number of network weights as the forward and backward pass require one pass each through the data sequence.

Figure 4:
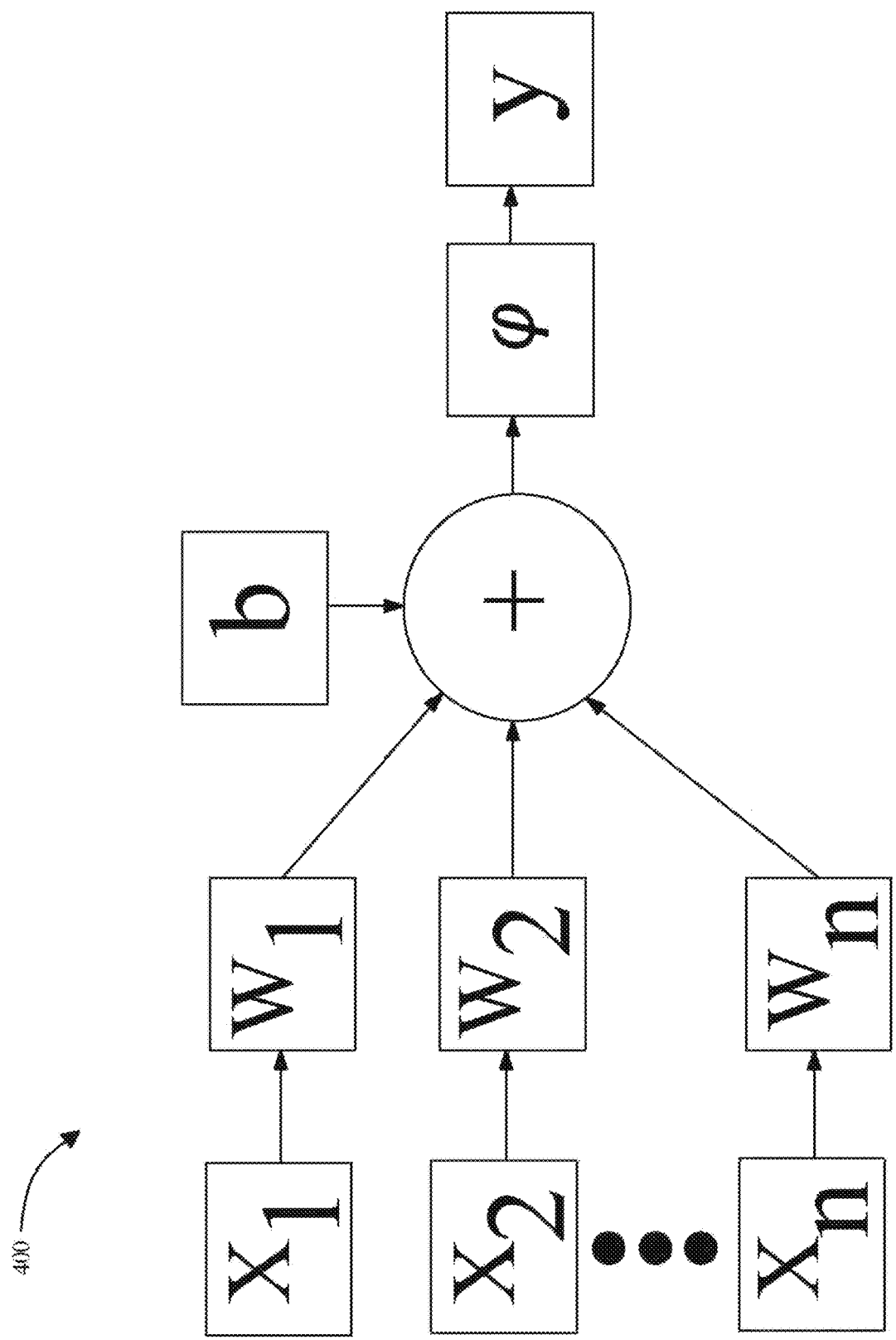
FIG. 4 is a block diagram illustrating an exemplary embodiment of nodes in a neural network.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
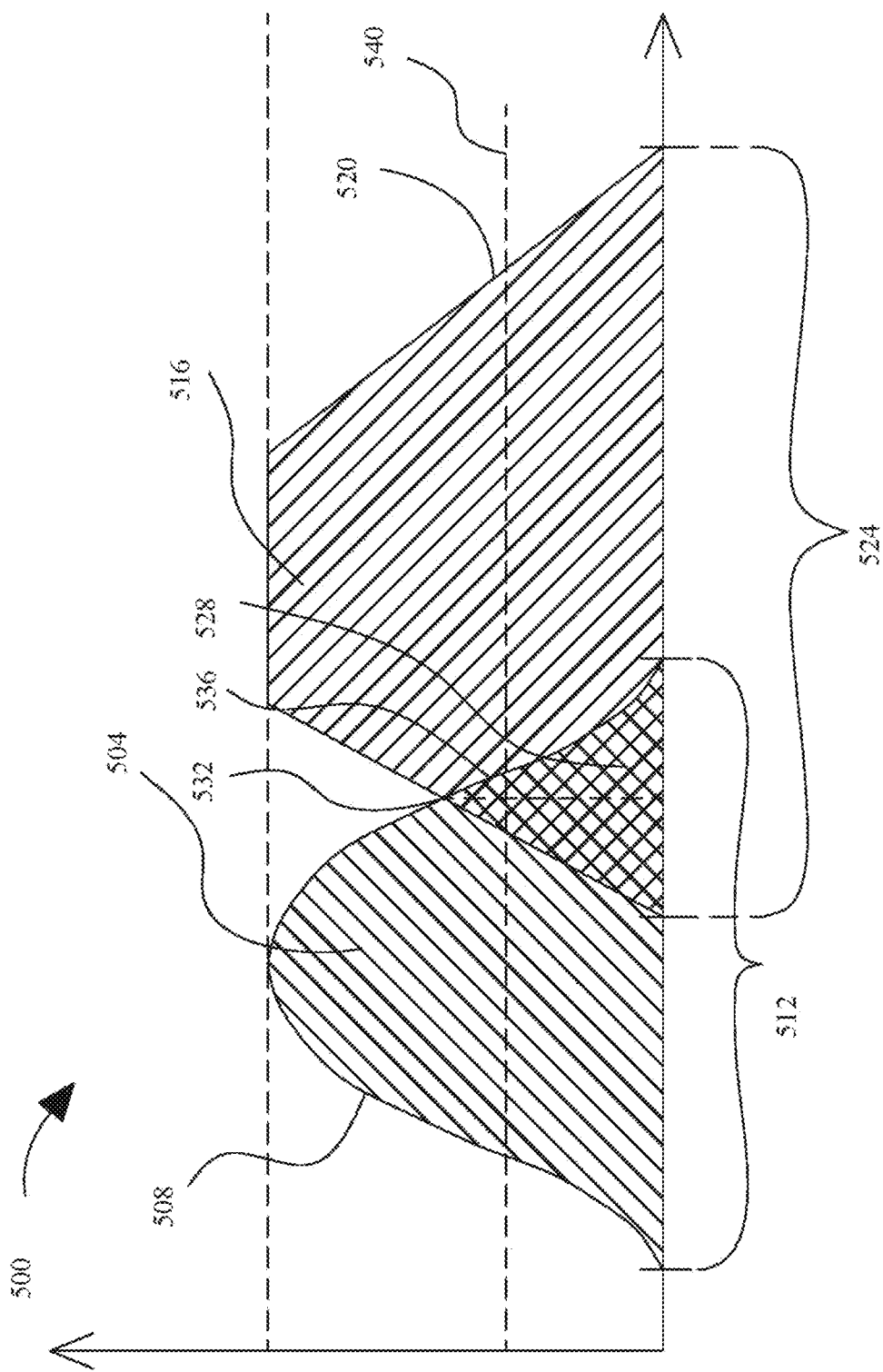
FIG. 5 is a graph illustrating an exemplary relationship between fuzzy sets.

Referring now to FIG. 5, the handwriting simulation model may be configured to utilize fuzzy sets for handwriting sample image processing and classification based on interpretation of imprecise information collected and processed as imprecision is often inherent to images. At a higher level, fuzzy sets can be used to represent both image information including its imprecision, and domain and expert knowledge. They are typically used to model symbolic or qualitative knowledge describing the expected content of the images (e.g., appearance and shape of the objects, spatial relations, and type of objects, etc.). In one embodiment, fuzzy sets may constitute a unified framework for representing and processing different types of imprecisions (e.g., imprecision in spatial location of objects and in membership of an object in a class) in the sample image at different levels (e.g., local, regional, or global) and the heterogeneous information directly extracted from the sample image as well as information derived from external knowledge. A membership function can be a function from the space on which the image is defined into [0, 1], representing the membership degree of each point to a spatial fuzzy object. Such models may represent different types of imprecisions, either on the boundary of the objects due to instance to partial volume effect or to the spatial resolution, on the variability of these objects, on the potential ambiguity between classes, etc. In addition, a membership function can also be a function from a space of attributes into [0, 1]. At numerical level, such attributes are typically the grey levels. The membership value represents the degree to which a grey level supports the membership to an object or a class. At a lower level, image processing relies on a representation of image information at the pixel level for clustering and classification. At an intermediate level, geometrical modelling and operations are performed and attributes can refer to a shape of image regions. Membership functions then allow determining to which degree an image region is elongated, regular, etc. At a global level, spatial relations of membership and objects in classes are represented.

Still referring to FIG. 5, in an exemplary embodiment, a first fuzzy set 504 may be represented, without limitation, according to a first membership function 508 representing a probability that an input falling on a first range of values 512 is a member of the first fuzzy set 504 where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models described in accordance with FIGS. 1-4 and a predetermined class, such as without limitation of fuzzy information extracted from handwriting datum. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or fuzzy information extracted from the prior handwriting image datum and a predetermined class, such as without limitation handwriting sample categorization, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify a fuzzy information extracted from the prior handwriting image datum with model representing knowledge expressed in fuzzy terms. For instance, if the information extracted from the prior handwriting image datum has a fuzzy set matching membership in a model representing external knowledge by having a degree of overlap exceeding a threshold, computing device 104 may classify the information extracted from the prior handwriting image datum as belonging to the modeled representation of knowledge expressed in fuzzy terms. Where multiple fuzzy matches are performed, degrees of match for each respective fuzzy set may be computed and aggregated through, for instance, addition, averaging, or the like, to determine an overall degree of match.

Still referring to FIG. 5, in an embodiment, a fuzzy set of a prior handwriting image datum may be compared to multiple modeled categorization fuzzy sets. For instance, a spatial correlation between adjacent characters may be represented by a fuzzy set that is compared to each of the multiple intermediate and global level categorization fuzzy sets; and a degree of overlap exceeding a threshold between the spatial correlation between adjacent characters represented by the fuzzy set and any fuzzy sets of the multiple intermediate and global level modeled categorization may cause computing device 104 to classify the spatial correlation between adjacent characters as belonging to one or more modeled representation of handwriting style expressed in fuzzy terms. For instance, in one embodiment there may be two handwriting fuzzy sets, representing respectively a two-dimensional geometric membership categorization and a character boundary/edge categorization. The two-dimensional geometric membership categorization may have a geometric membership fuzzy set; the character boundary/edge categorization may have a character boundary/edge fuzzy set; and prior handwriting image datum may have a handwriting fuzzy set. Processor 104, for example, may compare a handwriting fuzzy set with each of the two-dimensional geometric membership fuzzy set and the character boundary/edge categorization fuzzy set, as described above, and classify a handwriting fuzzy set to either, both, or neither of two-dimensional geometric membership categorization or the character boundary/edge categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, prior handwriting image datum may be used indirectly to determine a fuzzy set, as handwriting fuzzy set may be derived from outputs of one or more machine-learning models that take the prior handwriting image datum directly or indirectly as inputs.

Figure 6:
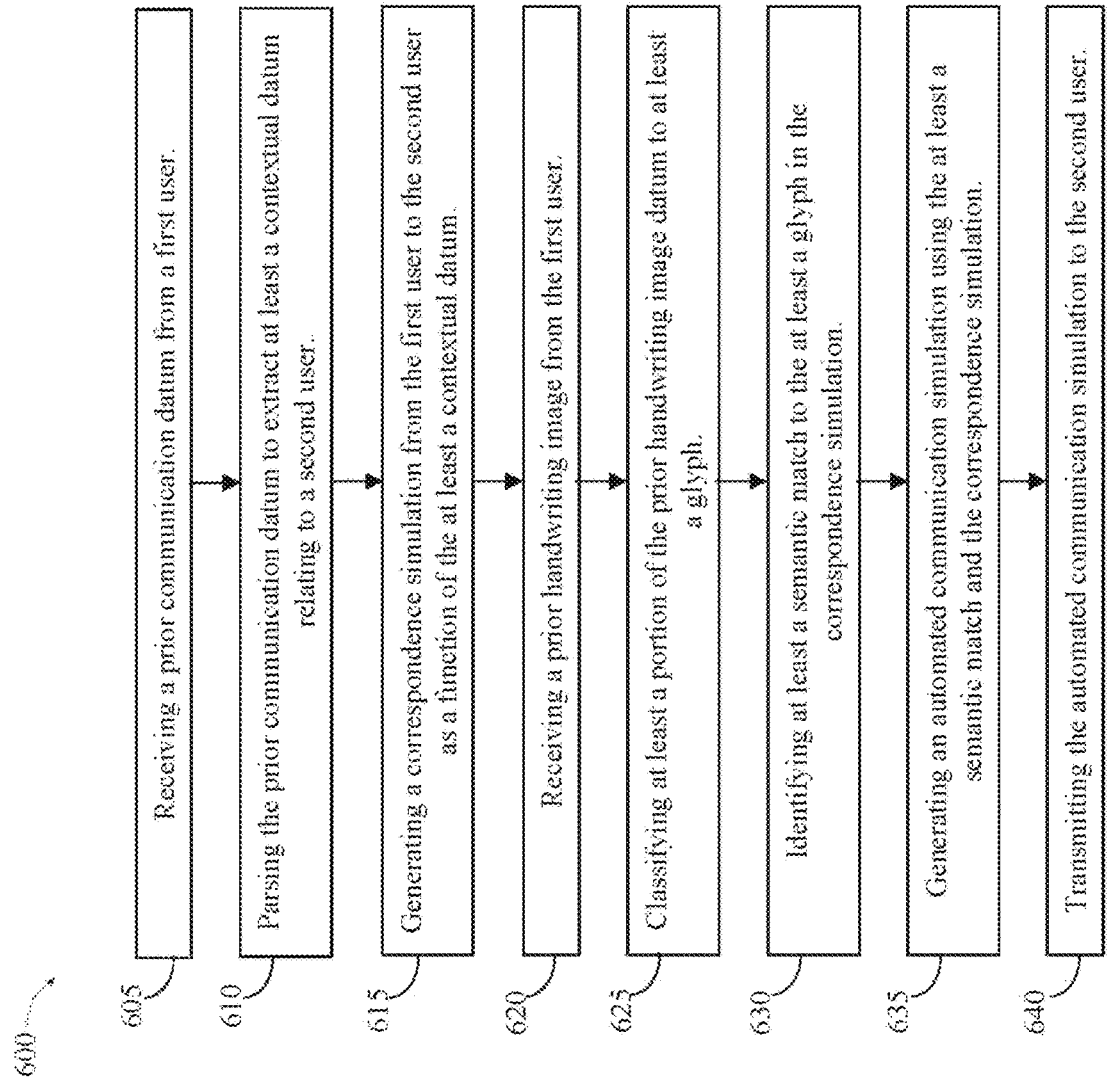
FIG. 6 is a flow diagram illustrating an exemplary method for generating automated communication simulation using Artificial Intelligence.

Referring now to FIG. 6, an exemplary method 600 for generating an automated communication simulation using Artificial Intelligence is illustrated. At step 605, method 600 includes receiving a prior communication datum from a first user. The prior communication datum, in one embodiment, may include handwritten correspondence between the first user and the second user, typed correspondence between the first user and the second user, electronic correspondence between the first user and the second user, recorded audio between the first user and the second user, recorded video between the first user and the second user, pictures between the first user and the second user, drawings between the first user and the second user, social media posts between the first user and the second user, and content describing activities, personality, and biographical facts of the first user and the second user. This may be implemented without limitation, as described above in reference to FIGS. 1-5.

Still referring to FIG. 6, at step 610, method 600 includes parsing the prior communication datum to extract at least a contextual datum relating to a second user. In one embodiment, the at least a contextual datum may include information such as communications, descriptions, text messages, pictures, videos, and the like associated with the first user and/or the second user. This may be implemented without limitation, as described above in reference to FIGS. 1-5.

Continuing to refer to FIG. 6, at step 615, method 600 includes generating a correspondence simulation from the first user to the second user as a function of the at least a contextual datum. In one embodiment, the correspondence simulation is generated using a machine-learning model trained by using at least a training sample and a machine-learning process, wherein the training sample correlates a prior communication between the first user and the second user to a contextual datum in similar context. This may be implemented without limitation, as described above in reference to FIGS. 1-5.

Still referring to FIG. 6, at step 620, method 600 includes receiving a prior handwriting image datum from the first user. In one embodiment, the prior handwriting image datum from the first user may be collected from any handwriting records such as physical and digital samples of handwriting images. Prior handwriting image datum, in one embodiment, may include a handwriting sample on a paper or an image of a handwriting sample. This may be implemented without limitation, as described above in reference to FIGS. 1-5.

Still referring to FIG. 6, at step 625, method 600 includes classifying at least a portion of the prior handwriting image datum to at least a glyph. In one embodiment, the at least a glyph may include information associated with an individual character based on the first user's unique handwriting, such as strokes, curves, thickness, loops, inflection points, positioning, aspect ratio, and the like. In some embodiment, a second machine-learning model is trained using at least a training sample, wherein the training sample correlates an image of the at least glyph to a semantic meaning of the at least a glyph. This may be implemented without limitation, as described above in reference to FIGS. 1-5.

Still referring to FIG. 6, at step 630, method 600 includes identifying at least a semantic match to the at least a glyph in the correspondence simulation. In one embodiment, a handwriting style datum is generated as a function of the at least a glyph in accordance with the prior handwriting image datum before an automated communication simulation is generated as a function of the correspondence simulation and at least a semantic match. This may be implemented without limitation, as described above in reference to FIGS. 1-5.

Continuing to refer to FIG. 6, at step 635, method 600 includes generating an automated communication simulation using the at least a semantic match and the correspondence simulation. This may be implemented without limitation, as described above in reference to FIGS. 1-5.

Still referring to FIG. 6, at step 640, method 600 includes transmitting the automated communication simulation to a second user. In one embodiment, the transmission may be made via a transmission module configured to send the automated communication simulation in a pre-selected format and at a pre-determined time interval. This may be implemented without limitation, as described above in reference to FIGS. 1-5.

Figure 7:
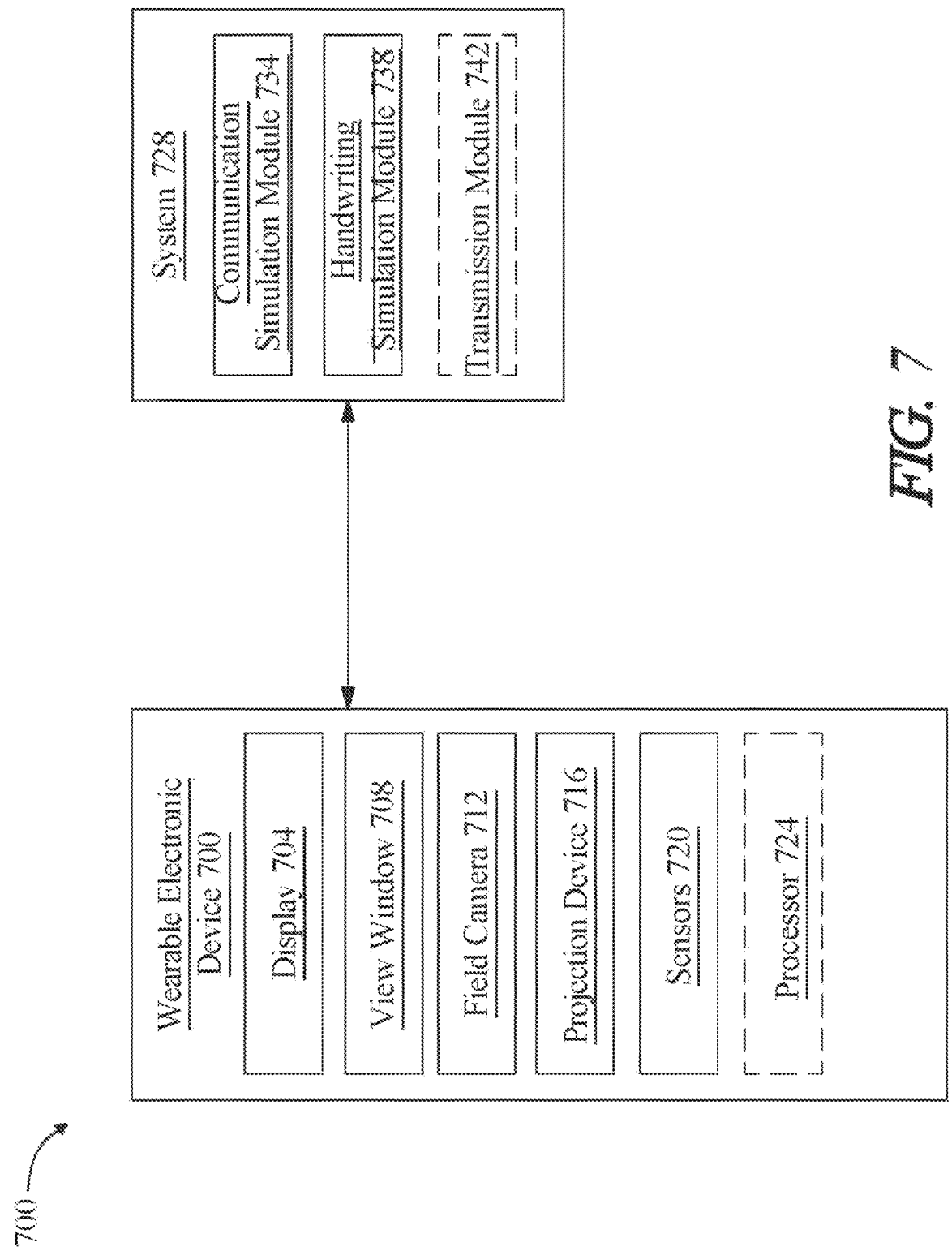
FIG. 7 is a block diagram illustrating an exemplary embodiment of a wearable electronic device communicatively connected to the system.

Referring now to FIG. 7, an exemplary embodiment of a wearable electronic device 700 is illustrated. In one embodiment, wearable electronic device 700 is communicatively connected to a system for generating automated communication simulation using Artificial Intelligence. The device may include a display 704 configured to capture a live feed via a view window 708 using a field camera 712 that matches a field of vision of a recipient of the automated communication simulation. View window 708 is defined for the purposes of this disclosure as a portion of wearable electronic device 700 that admits a view of the field of vision. In one embodiment, view window 708 may include a transparent window, such as a transparent portion of googles such as lenses or the like. Alternatively, view window 708 may include a screen that displays the field of vision to the recipient. Wearable electronic device may also include a projection device 716 configured to project live feed and overlay the automated communication simulation (e.g., video and audio simulation of a first user) on the field of vision of the recipient. Projection device 716 and/or view window 708 may make use of reflective waveguides, diffractive waveguides, or the like to transmit, project, and/or display video and/or images simulated from the system. For instance, and without limitation, projection device 716 and/or display 704 may project images and/or videos and/or holograms of the first user and/or first user and the second user together through and/or reflect images off an eyeglass-like structure and/or lens piece, where either both field of vision and images from projection device 716 may be so displayed, or the former may be permitted to pass through a transparent surface. Projection device 716 and/or view window 708 may be incorporated in a contact lens or eye tap device, which may introduce images into light entering an eye to cause display of such images. Projection device 716 and/or view window 708 may display some images using a virtual retina display (VRD).

Still referring to FIG. 7, wearable electronic device 700 may be implemented in any suitable way, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like. Persons skilled in the art, upon reviewing the entirety of this disclosure, will be aware of various optical projection and/or display technologies that may be incorporated in augmented reality device 700 consistently with this disclosure.

Further referring to FIG. 7, view window 708, projection device 716, and/or other display devices incorporated in wearable electronic device 700 may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in wearable electronic device 700.

Continuing to refer to FIG. 7, wearable electronic device 700 may include a field camera 712. A "field camera," as used in this disclosure, is an optical device, or combination of optical devices, configured to capture field of vision as an electrical signal, to form a digital image. Field camera 712 may include a single camera and/or two or more cameras used to capture field of vision; for instance, and without limitation, the two or more cameras may capture two or more perspectives for use in stereoscopic and/or three-dimensional display, as described above. Field camera 712 may capture a feed including a plurality of frames, such as without limitation a video feed.

Still referring to FIG. 7, wearable electronic device 700 may include a plurality of sensors 720. In one embodiment, the plurality of sensors 720 include at least a motion sensor. The motion sensor may include, without limitation, a micro-electromechanical system (MEMS) sensor, an inertial measurement unit (IMU), one or more accelerometers; one or more accelerometers may include a plurality of accelerometers, such as three or more accelerometers positioned to span three dimensions of possible acceleration, so that any direction and magnitude of acceleration in three dimensions may be detected and measured in three dimensions. In some embodiments, sensor 720 may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. In some embodiments, sensors 720 may include, without limitation magnetic sensors such as Hall effect sensors, compasses such as solid-state compasses, or the like. Persons skilled in the art, upon reviewing the entirety of this disclosure, will be aware of various components and/or devices that may be used as sensors 720 consistently with this disclosure.

Still referring to FIG. 7, wearable electronic device 704 may include a processor 724. Processor 724 may include and/or be included in any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 724 may include and/or be included in a single computing device operating independently, or may include two or more computing device operating in concert, in parallel, sequentially or the like; two or more computing devices may be included together in a single computing device or in two or more computing devices. Processor 724 may interface or communicate with one or more additional devices as described below in further detail via a network interface device. In one embodiment, processor 724 is communicatively connected to a system 728 for generating automated communication simulation using communication simulation model 734, handwriting simulation model 738, and transmission module 742. Network interface device may be utilized for connecting processor 724 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 724 may include but is not limited to, for example, a computing device or cluster of computing devices in a first location and a second computing device or cluster of computing devices in a second location. Processor 724 may include and/or be included in one or more computing devices dedicated to data storage, security, distribution of traffic for load balancing, and the like. Processor 724 may distribute one or more computing tasks as described below across a plurality of computing devices of computing device, which may operate in parallel, in series, redundantly, or in any other manner used for distribution of tasks or memory between computing devices. Processor 724 may be implemented using a "shared nothing" architecture in which data is cached at the worker, in an embodiment, this may enable scalability of apparatus 100 and/or computing device.

Still referring to FIG. 7, processor 724 may include a device and/or component incorporated in and/or attached to wearable electronic device 704. For instance, processor 724 may include a microcontroller, system on chip, FPGA, or other compact hardware element that is incorporated in and/or attached to wearable electronic device 704. Alternatively or additionally, processor 724 may include a device communicating with wearable electronic device 704 via a wireless and/or wired connection. In an embodiment, processor 724 may include a device incorporated in wearable electronic device 704 and a device communicating therewith via wired and/or wireless connection.

Still referring to FIG. 7, processor 724 may be designed and/or configured to perform any method, method step, or sequence of method steps in any embodiment described in this disclosure, in any order and with any degree of repetition. For instance, processor 724 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 724 may perform any step or sequence of steps as described in this disclosure in parallel, such as simultaneously and/or substantially simultaneously performing a step two or more times using two or more parallel threads, processor 724 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof.

Figure 8:
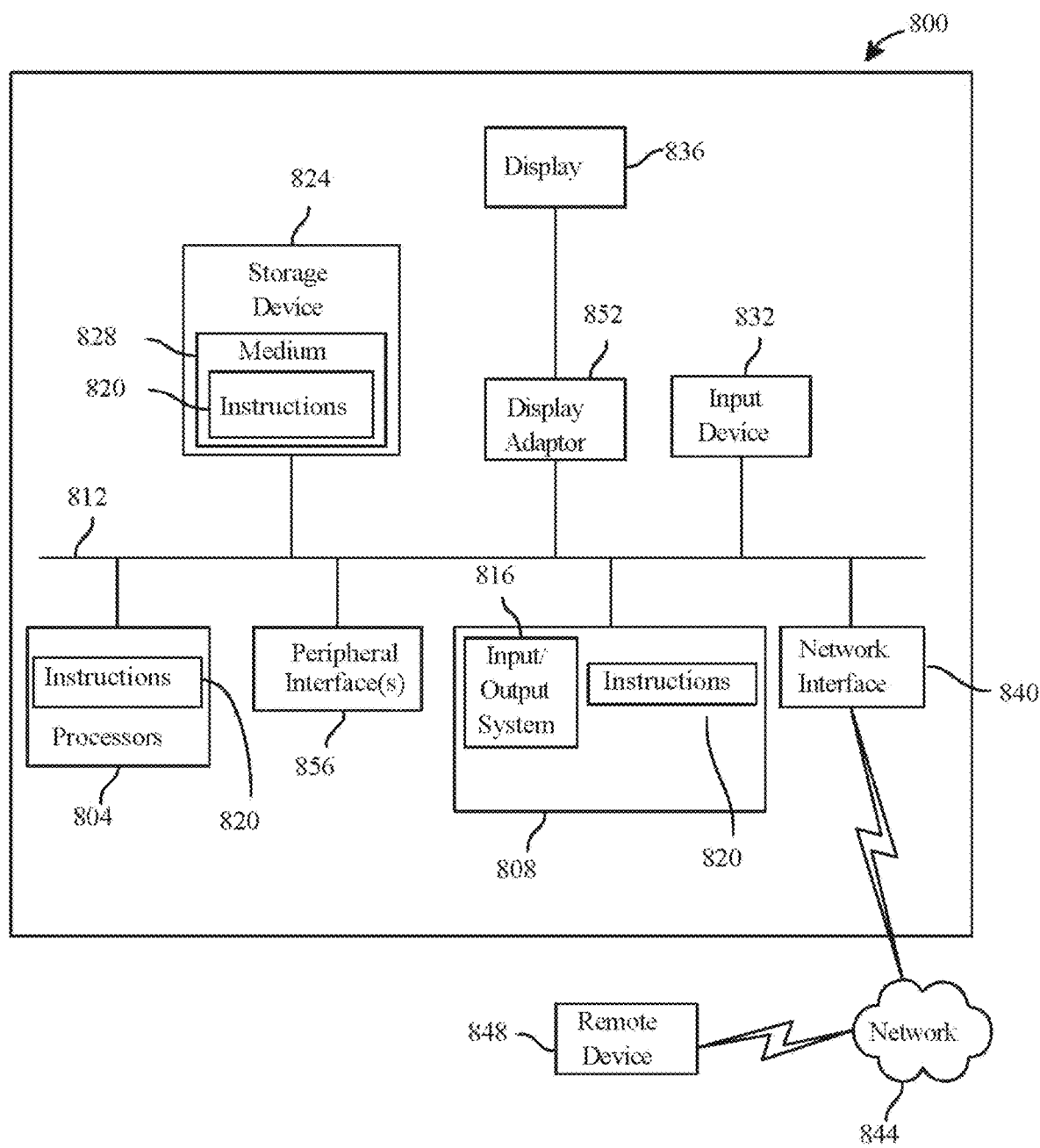
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system, such as apparatus 100 of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a digital stylus, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 820, etc.) may be communicated to and/or from computer system 800 via network interface device 840. In one embodiment, computer system 800 can generate and provide a QR code associated with the automated communication simulation to a second user such that the automated communication simulation can be accessed via an external device.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating automated communication simulation using artificial intelligence, the apparatus comprising:
   at least a processor; and
   a memory communicatively connected to the processor, wherein the memory including instructions configuring the at least a processor to:
   receive a prior communication datum from a first user;
   parse the prior communication datum to extract at least a contextual datum relating to a second user;
   generate a correspondence simulation from the first user to the second user as a function of the at least a contextual datum;
   receive a prior handwriting image datum from the first user;
   classify at least a portion of the prior handwriting image datum to at least a glyph; identify at least a semantic match to the at least a glyph in the correspondence simulation; and
   generate an automated communication simulation using the at least a semantic match and the correspondence simulation; and
   transmit the automated communication simulation to the second user.

2. The apparatus of claim 1, wherein receiving the prior handwriting image datum from the first user comprises utilizing at least a neural network configured to analyze the prior handwriting datum.

3. The apparatus of claim 1, wherein classifying the at least a portion of the prior handwriting image datum to at least a glyph comprises generating a handwriting style datum as a function of the at least a glyph.

4. The apparatus of claim 3, wherein the at least a processor is further configured to train a handwriting simulation model using at least a training sample and a machine-learning process.

5. The apparatus of claim 4, wherein the at least a training sample correlates an image of the at least a glyph to a semantic meaning of the at least a glyph.

6. The handwriting simulation model of claim 4, wherein the model comprises a handwriting text recognition module configured to remove ambiguity and inconsistency of a handwriting style of the first user.

7. The apparatus of claim 4, wherein the handwriting simulation model further comprises a digital stylus configured to track a plurality of stroke data while text is being written by the first user in order to improve accuracy of the handwriting style datum.

8. The apparatus of claim 1, wherein the processor is configured to automatically transmit the automated communication simulation in a pre-selected format and at a pre-determined time interval.

9. The apparatus of claim 1, wherein the prior communication datum is selected from the group consisting of handwritten correspondence between the first user and the second user, typed correspondence between the first user and the second user, electronic correspondence between the first user and the second user, recorded audio between the first user and the second user, recorded video between the first user and the second user, pictures between the first user and the second user, drawings between the first user and the second user, social media posts between the first user and the second user, and content describing activities, personality, and biographical facts of the first user and the second user.

10. The apparatus of claim 1, wherein the apparatus further comprises a wearable electronic device communicatively connected to the processor; and wherein the wearable electronic device comprises:
a display, wherein the display is configured to:
capture a live feed via a view window using a field camera that matches a field of vision of the second user;
overlay the automated communication simulation on the field of vision of the second user, wherein the automated communication simulation comprises video and audio simulations of the first user; and
project the live feed and the automated communication simulation on the display using a projection device; and
a plurality of sensors configured to facilitate an augmented reality experience.

11. A method for generating automated communication simulation using Artificial Intelligence, the method comprising:
receiving, by at least a processor, a prior communication datum from a first user;
parsing the prior communication datum to extract at least a contextual datum relating to a second user;
generating a correspondence simulation from the first user to the second user as a function of the at least a contextual datum;
receiving a prior handwriting image datum from the first user;
classifying at least a portion of the prior handwriting image datum to at least a glyph;
identifying at least a semantic match to the at least a glyph in the correspondence simulation; and
generating an automated communication simulation using the at least a semantic match and the correspondence simulation; and
transmitting the automated communication simulation to the second user.

12. The method of claim 11, wherein receiving the prior handwriting image datum from the first user comprises utilizing at least a neural network configured to analyze the prior handwriting datum.

13. The method of claim 11, wherein classifying the at least a portion of the prior handwriting image datum to at least a glyph comprises generating a handwriting style datum as a function of the at least a glyph.

14. The method of claim 13, wherein the at least a processor is further configured to train a handwriting simulation model using at least a training sample and a machine-learning process.

15. The method of claim 14, wherein the at least a training sample correlates an image of the at least a glyph to a semantic meaning of the at least a glyph.

16. The method of claim 14, wherein the handwriting simulation model comprises a handwriting text recognition module configured to remove ambiguity and inconsistency of a handwriting style of the first user.

17. The method of claim 14, wherein the handwriting simulation model further comprises a digital stylus configured to track a plurality of stroke data while text is being written by the first user in order to improve accuracy of the handwriting style datum.

18. The method of claim 11, wherein the processor is configured to automatically transmit the automated communication simulation in a pre-selected format and at a pre-determined time interval.

19. The method of claim 11, wherein the prior communication datum is selected from the group consisting of handwritten correspondence between the first user and the second user, typed correspondence between the first user and the second user, electronic correspondence between the first user and the second user, recorded audio between the first user and the second user, recorded video between the first user and the second user, pictures between the first user and the second user, drawings between the first user and the second user, social media posts between the first user and the second user, and content describing activities, personality, and biographical facts of the first user and the second user.

20. The method of claim 11, wherein the apparatus further comprises a wearable electronic device communicatively connected to the processor; and wherein the wearable electronic device comprises:
a display, wherein the display is configured to:
capture a live feed via a view window using a field camera that matches a field of vision of the second user;
overlay the automated communication simulation on the field of vision of the second user, wherein the automated communication simulation comprises video and audio simulations of the first user; and
project the live feed and the automated communication simulation on the display using a projection device; and a plurality of sensors configured to facilitate an augmented reality experience.

* * * * *